US011911735B2

(12) United States Patent
Schreiber et al.

(10) Patent No.: US 11,911,735 B2
(45) Date of Patent: Feb. 27, 2024

(54) MULTIPLE-CHAMBER CONTAINER FOR STORING AND MIXING A MULTI-COMPONENT LIQUID COATING OR ADHESIVE SYSTEM

(71) Applicant: COVESTRO INTELLECTUAL PROPERTY GMBH & CO. KG, Leverkusen (DE)

(72) Inventors: Marc Schreiber, Leverkusen (DE); Jan Weikard, Leverkusen (DE); Holger Mundstock, Wermelskirchen (DE); Robert Maleika, Düsseldorf (DE); Sascha Frischke, Bergisch Gladbach (DE); Wilfred Teunissen, Utrecht (NL); Herman Van Der Vegt, Utrecht (NL); Michiel De Haan, Haarlem (NL)

(73) Assignee: Covestro Deutschland AG, Leverkusen (DE)

( * ) Notice: Subject to any disclaimer, the term of this patent is extended or adjusted under 35 U.S.C. 154(b) by 782 days.

(21) Appl. No.: 16/971,940

(22) PCT Filed: Feb. 21, 2019

(86) PCT No.: PCT/EP2019/054354
§ 371 (c)(1),
(2) Date: Feb. 16, 2021

(87) PCT Pub. No.: WO2019/162397
PCT Pub. Date: Aug. 29, 2019

(65) Prior Publication Data

US 2021/0197153 A1 Jul. 1, 2021

(30) Foreign Application Priority Data

Apr. 23, 2018 (EP) .................................... 18168745

(51) Int. Cl.
*B01F 35/71* (2022.01)
*B05B 7/24* (2006.01)
(Continued)

(52) U.S. Cl.
CPC .... *B01F 35/7162* (2022.01); *B01F 33/50114* (2022.01); *B01F 35/32021* (2022.01);
(Continued)

(58) Field of Classification Search
USPC ........... 118/300; 206/222, 219, 229; 222/80, 222/145.1, 145.5, 1
See application file for complete search history.

(56) References Cited

U.S. PATENT DOCUMENTS

| | | | | |
|---|---|---|---|---|
| 3,860,114 A * | 1/1975 | Merckardt | ............... | A61C 5/66 604/416 |
| 4,858,759 A | 8/1989 | Mauthe et al. | | |

(Continued)

FOREIGN PATENT DOCUMENTS

| | | |
|---|---|---|
| DE | 2248784 A1 | 4/1974 |
| DE | 3545614 A1 | 6/1987 |

(Continued)

OTHER PUBLICATIONS

English Translation DE 3545614A1 (Year: 1987).*
(Continued)

*Primary Examiner* — Yewebdar T Tadesse
(74) *Attorney, Agent, or Firm* — The Webb Law Firm

(57) ABSTRACT

The invention relates to a multiple-chamber container (1, 1*) for storing and mixing a multi-component liquid coating or adhesive system (M), comprising a first chamber (10) for a first mixing component (B) and at least one other chamber (20) for another mixing component (H), the first chamber (10) and the at least one other chamber (20) being separated by at least one separating wall (30) in liquid-tight fashion
(Continued)

Figure 1:
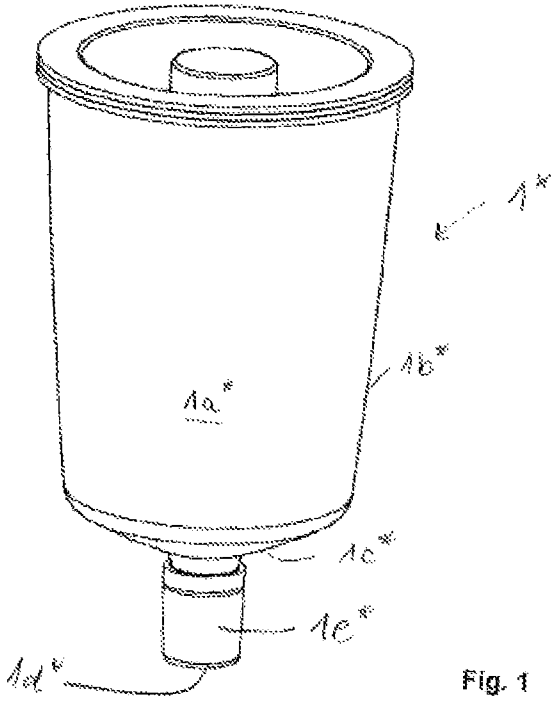

and the separating wall (30) comprising a pierceable separating layer (40). The multiple-chamber container further comprises at least one piercing element (50) for piercing the pierceable separating layer (40) in such a way that the first and the one other mixing component (B, H) mix in the first or the at least one other chamber (10, 20). The multiple-chamber container (1, 1*) is characterized in that the at least one other chamber (20) is coaxial to the first chamber (10), the separating layer (40) being partially formed in the separating wall (30). The piercing element (50) is hollow, in particular hollow-cylindrical, and has at least two longitudinally offset openings (51) for introducing either the first or the other mixing component (B, H) into the chamber (10, 20) of the respective other mixing component (H, B).

13 Claims, 7 Drawing Sheets

(51) Int. Cl.

| | |
|---|---|
| ***B65D 81/32*** | (2006.01) |
| ***B01F 33/501*** | (2022.01) |
| ***B01F 35/32*** | (2022.01) |
| *B01F 101/36* | (2022.01) |
| *B01F 101/00* | (2022.01) |

(52) U.S. Cl.

CPC ........ *B01F 35/7137* (2022.01); *B05B 7/2408* (2013.01); *B05B 7/2472* (2013.01); *B05B 7/2478* (2013.01); *B65D 81/3222* (2013.01); *B01F 2101/2305* (2022.01); *B01F 2101/36* (2022.01)

(56) References Cited

U.S. PATENT DOCUMENTS

| | | | |
|---|---|---|---|
| 2002/0040856 | A1 | 4/2002 | Mollstam et al. |
| 2009/0188987 | A1 | 7/2009 | Connelly et al. |
| 2015/0016208 | A1 | 1/2015 | Larson et al. |

FOREIGN PATENT DOCUMENTS

| | | | |
|---|---|---|---|
| EP | 0254564 | A2 | 1/1988 |
| JP | S63236556 | A | 10/1988 |
| WO | WO-2005105612 | A1 | 11/2005 |
| WO | WO-2007073055 | A1 | 6/2007 |
| WO | WO-2010084140 | A1 | 7/2010 |

OTHER PUBLICATIONS

International Search Report for PCT/EP2019/054354 dated Jul. 18, 2019.

Written Opinion of the International Searching Authority for PCT/EP2019/054354 dated Jul. 18, 2019.

* cited by examiner

MULTIPLE-CHAMBER CONTAINER FOR STORING AND MIXING A MULTI-COMPONENT LIQUID COATING OR ADHESIVE SYSTEM

CROSS-REFERENCE TO RELATED APPLICATIONS

This application is a national stage application (under 35 U.S.C. § 371) of PCT/EP2019/054354, filed Feb. 21, 2019, which claims benefit of European Application Nos. 18158105.9, filed Feb. 22, 2018, and 18168745.0, filed Apr. 23, 2018, all of which are incorporated herein by reference in their entirety.

The invention relates to a multichamber vessel for storing and mixing a multicomponent liquid coating or adhesive system having a first chamber for a first mixture component and at least one further chamber for a further mixture component, where the first chamber and the at least one further chamber are divided from one another in a liquid-tight manner by at least one dividing wall, where the at least one dividing wall comprises a penetrable dividing layer, and having a penetrating element for penetrating the penetrable dividing layer in such a way that the first and the one further mixture components mix in the first or at least one further chamber. The present invention further relates to a system for deploying a coating or an adhesive, and to a method of mixing a multicomponent liquid coating or adhesive system.

Multichamber vessels of the type specified at the outset are known from the prior art. They are used, for example, together with paint spray guns for automotive repair paints. In the case of one-component paints, these are simply introduced into or provided in a cup-like vessel which is placed onto the paint spray gun. If two-component paint systems are used, the components first have to be mixed prior to deployment by the spray gun. This is generally done manually. Particularly appropriate systems of this kind are found to be those in which the two components are stored separately from one another in different chambers of a cup that can be screwed on to the paint spray gun. The dividing wall between the chambers for the purpose of mixing the components is destroyed here prior to the painting operation, such that the components merge and mix. The mixture can then be deployed immediately subsequently by means of the spray gun.

Typical two-component paint systems comprise a binder as the first component and a curing agent as the second component. Examples of such paint systems are polyurethane paints having an isocyanate-containing component and an isocyanate-reactive, e.g. hydroxyl-containing, component, and epoxy paints having an epoxy-containing component and an epoxy-reactive, e.g. aminic, component.

A generic multichamber system of the type described above is known from US2009/0188987 A1. In this case, there are two chambers (even three in one working example) arranged one on top of another in a common cup-like vessel and spatially separated from one another by a dividing film. For mixing of the paint components, the dividing film is penetrated by means of a spike, such that the paint components mix with one another in the lower chamber. In practice, it has been found to be disadvantageous in this principle that the film barrier, owing to its flexibility, shows quite undefined behavior on penetration, such that defined destruction of the barrier is often unsuccessful in the desired form.

A further multichamber vessel for storing and mixing a multicomponent liquid coating or adhesive system is known from WO2010/084140 A1. The multichamber vessel disclosed in this publication comprises a flexible pouch made of a liquid-tight material spanning an articulated frame. By means of the central joint, it is possible to divide the pouch into two separate component volumes into which the two mixture components can be introduced. For mixing of the components, the frame is stretched, such that the liquids can merge and mix. Subsequently, the mixture can be deployed via a valve at the edge and introduced, for example, into a spray gun. By virtue of the flexible construction, this variant of a multichamber vessel does have advantages in the area of waste disposal, but has excessively high mechanical sensitivity overall. Furthermore, the spatial separation of the mixture components is not optimal for the purpose of maximum shelf life. Moreover, the wall thicknesses of the flexible pouch materials are comparatively low, and so significant swelling or even instability has to be expected for solvent-borne paint systems. If, by contrast, film composites comprising a metal foil, for example aluminum foil, are used to prevent swelling, the user is unable to visually check that the paint materials are in impeccable condition prior to use.

Proceeding from the prior art discussed above, it is an object of the present invention to provide a multichamber vessel for storing and mixing a multicomponent liquid coating or adhesive system, with which reliable storage of the mixture components on the one hand and an easily and reliably performable mixing operation on the other hand are possible, and which further permits simple deployment of the mixture.

The object is achieved in accordance with the invention by a multichamber vessel for storing and mixing a multicomponent liquid coating or adhesive system according to the preamble of claim 1 in that the at least one further chamber is arranged coaxially in the outer vessel, where the dividing layer forms part of the area of the dividing wall, where the penetrating element is in hollow form, especially hollow cylindrical form, and has at least two longitudinally offset openings for introduction of one of the first or further mixture components into the chamber of the respective other mixture component.

According to the invention, the multichamber vessel comprises a first chamber for a first mixture component and at least one further chamber for a further mixture component, wherein the first chamber and the at least one further chamber are divided from one another in a liquid-tight manner by a dividing wall. The number of chambers is accordingly unlimited, such that the multichamber vessel of the invention is also suitable for liquid coating or adhesive systems having more than two components, for example.

The particular advantage of the multichamber vessel of the invention lies in reliable storage of the individual mixture components without the risk of portions of the mixture components being able to merge in the event of improper handling of the multichamber vessel. This is ensured by means of the dividing wall provided between the first and the at least one further chamber. On the other hand, the penetrating element that interacts with the penetrable dividing layer assures the establishment of a defined liquid-conducting connection between the chambers, such that intensive mixing of the mixture components is possible. By virtue of the penetrable dividing layer forming part of the area of the dividing wall, it is ensured that defined penetration of the dividing wall is possible at any time since, owing to the limited extent of the dividing surface within the dividing wall, the dividing surface is prevented from rebounding in an unwanted manner on penetration by means of the penetrating element. A dividing wall over part of the area further has the advantage that it is subjected only to minor mechanical stress on movement of the multichamber vessel. Thus, the larger the penetrable and hence inherently mechanically labile dividing layer, the greater the forces that act on the dividing wall on agitation of the liquid-filled vessel. In order to prevent unwanted mixing as a result of shaking, for example in the course of transport of the vessels, therefore, a relatively small dividing layer that does not cover the full area is advantageous.

The dividing layer is preferably formed by a film material which on the one hand has adequate service life and is sufficiently resistant to unintended pressurization and chemicals used in each case, but on the other hand can be penetrated readily and precisely by the penetrating element. Suitable film materials are metal foils, for example aluminum foils, polymer foils made of ABS, CA, COC, CTA, E/P, ETFE, FEP, PA, PAEK, PAN, PBT, PC, PCCE, PCO, PCT, PDCPD, PE (PE-C, PE-HD, PE-LD, PE-LLD, PE-MD, PE-UHMW, PE-ULD), PEC, PEEK, PESTUR, PESU, PET, PEUR, PHB, PI, POM, PP, PS, PTT, PUR, PVC, PVDF (abbreviations to DIN EN ISO 1043-1:2012-03). In addition, composite films composed of metal and plastic are preferentially suitable. These combine properties such as prevention of diffusion between the mixture components of the individual chambers, sealability in order to bond appropriate film materials tightly to the material of the chamber vessel, and mechanical strength to counter stress by liquid movements in the chambers in the course of transport of the vessel, and ease of penetration. Corresponding film composites are known for foods, for example, from the packing sector for example.

It is also envisaged in accordance with the invention that the at least one further chamber is arranged coaxially relative to the first chamber. This coaxial arrangement ensures that, when the multichamber vessel of the invention is for example utilized together with a deployment unit for the multicomponent liquid coating or adhesive system, especially a paint spray gun, no troublesome tilting effects arise prior to the mixing. Moreover, coaxial arrangements can be achieved by particularly simple constructions.

In this connection, in an advantageous configuration of the invention, it is envisaged that the first chamber is formed by an outer vessel, wherein the at least one further chamber takes the form of a cup- or dish-shaped insert in the outer vessel. This also reduces the construction and manufacturing complexity in that the multichamber vessel is formed by comparatively few elements that can be assembled effortlessly by hand or by machine.

In a further advantageous configuration of the invention, the relative volume ratio of the first chamber for the first mixture component to the at least one further chamber for the further mixture component(s) is 1:1 to 9:1, preferably 1:1 to 5:1. This takes account of the volumes that are typically to be mixed with one another in the provision and processing of standard liquid coating or adhesive systems.

It is also envisaged in accordance with the invention that the penetrating element is in hollow form, especially in hollow cylindrical form, and has at least two longitudinally offset openings for introduction of one of the first or further mixture components into the chamber of the respective other mixture component. As a result, it is thus unnecessary for the dividing layer to be destroyed (in an uncontrolled manner) in the environment of the penetrating element as well in order to enable mixing of the mixture components, in that one of the mixture components effectively flows past the penetrating element into the respective other chamber. Instead, it is possible to precisely influence the mixing process, especially the mixing rate, for example in a quantitative manner by virtue of the size of the openings and the internal dimensions of the penetrating element. It is advisable for at least one of the two openings longitudinally offset from one another to be disposed in the end face of the penetrating element, especially in the region of a blade.

The penetrating element may have been manufactured from different materials and may likewise have different geometries. The penetrating element is preferably in the form of a pin or rod and has a sharpened tip or circumferential cutting edge that enables simple and reliable penetrating of the dividing layer. The geometry of the penetrating element should be configured here such that, irrespective of the vertical position of the penetrating element during and after the penetration, complete emptying of the liquid from the upper chamber is assured and the exit opening is not blocked.

As mentioned, the multichamber vessel of the invention may comprise more than two chambers. In the case of more than two mixture components, for example three mixture components, the dividing wall between the chambers may be configured in such a way that the first chamber is divided from the second and third chambers by a common dividing wall, with division of the first chamber from the second chamber by a first dividing wall section and of the first chamber from the third chamber by a second dividing wall. In this case, each dividing wall section has a penetrable dividing layer formed over part of the area based on the respective dividing wall section, which is designed to be penetrable by a penetrating element in each case. One penetrating element each may be provided for the second and third chambers, which penetrates the respective dividing wall section on actuation, resulting in mixing of the components, preferably in the first chamber.

It is likewise possible that, in one configuration of the invention, again with three mixture components and three chambers, one chamber is arranged between the two other chambers in such a way that, for example, the first chamber is divided from the second chamber by a first dividing wall and the second chamber from the third chamber by a second dividing wall. According to the invention, each of the two dividing walls has a dividing layer formed over part of the area. If the two dividing walls lie flush to one another, the dividing layers of the two dividing walls may preferably be penetrated successively by a single penetrating element.

In an advantageous configuration of the invention, the dividing layer that extends over part of the area of the dividing wall is arranged centrally in the dividing wall. Preferably, the dividing wall surrounding the dividing layer here is in conical form. As a result of this, by virtue of gravity, running of one mixture component into the other chamber and mixing of the two mixture components therein is facilitated after the dividing layer has been penetrated. In order to enable rapid and complete outflow of one mixture component, half of the opening angle of the cone relative to the longitudinal axis of the multichamber vessel is preferably not more than 85°, preferably not more than 80°.

Materials used for production of the multichamber vessel and the first chamber and/or the at least one further chamber include plastics, metals, glass, ceramic and composite materials, and coated materials, and combinations of the aforementioned materials. The selection thereof is guided by the demands that result from the material properties of the mixture components, and from the mechanical stress profile to be expected (for example use in a paint shop). In any case, however, the mixture components must not change as a result of contact with the material or the materials in such a way that they become unusable, nor may the mixture components themselves change the material(s) such that they cannot fulfill their function as packaging for the mixture components. The materials are accordingly selected by simple tests, in that mixture components are stored in packaging made of the respective material, and material and mixture component are checked regularly. Plastic is preferred as material, especially PA, PBT, PE (PE-C, PE-HD, PE-LD, PE-LLD, PE-MD, PE-UHMW, PE-ULD), PET (abbreviations to DIN EN ISO 1043-1:2012-03). In order to increase the stability of the chamber materials against solvent-borne mixture components, for example, it may be appropriate to provide the plastics with correspondingly resistant coatings at least on the surfaces that are in contact with the mixture components.

Preferably, the multichamber vessel and the first chamber and/or the at least one further chamber are formed from a transparent or translucent material. In this way, it is possible in a simple manner to ascertain the respective fill level of the mixture components in the chambers. In addition, the penetrating of the dividing layer can be observed and assisted, for example, by agitation of the multichamber vessel.

In order to discharge the mixture formed from the mixture components from the multichamber vessel and to guide it into a spray gun, for example, the multichamber vessel preferably has a closable outflow opening. If, in accordance with the above, the first chamber is formed by an outer vessel, where the at least one further chamber takes the form of a cup-shaped insert in the outer vessel, the outflow opening is preferably provided in the outer vessel that forms the first chamber.

In a particularly advantageous configuration of the invention, a catalyst capsule containing a catalyst material is disposed at the outflow opening, in such a way that the mixture formed from the first and further mixture components comes into contact with the catalyst material as it flows out. For example, the mixture formed from the mixture components may have a comparatively long processing time (pot life), such that processing need not immediately follow the mixing operation, which is an advantage depending on the particular use. As soon as the mixture then comes into contact with the catalyst material present in the catalyst capsule, there is an accelerated chemical reaction (crosslinking), by means of which the processing time is shortened, such that, for example, in the case of immediately subsequent deployment of the mixture, there is rapid curing on a surface.

For this purpose, the catalyst material may be configured in the form of a catalyst bed containing a catalyst reversibly sorbed on a substrate. The catalyst bed is regarded here as being a defined volume which contains substrate and catalyst, where the catalyst cannot leave the substrate (for example through use of sieve inserts).

It is envisaged in accordance with the invention that the catalyst is reversibly sorbed on the substrate. Possible options here include both an adsorption and an absorption. The sorption can be effected by impregnating the substrate with a solution of the catalyst and then evaporating the solvent. The fact that the sorption is reversible means that a sorbed catalyst can also be released again to a liquid phase in an amount effective for catalysis of the reaction. It is therefore also preferable that the substrate is not graphite or activated carbon.

Suitable substrates may be solid catalysts and catalyst supports as known from heterogeneous catalysis. These also include zeolites/molecular sieves such as zeolite A and zeolite X, and other porous ceramics. Examples of suitable catalysts are guided by the nature of the mixture components. If, for example, a polyurethane reaction is to be catalyzed since one mixture component contains an isocyanate-containing compound and the other mixture component an isocyanate-reactive compound, preference is given to titanium catalysts, zirconium catalysts, bismuth catalysts, tin catalysts and/or iron-containing catalysts. Particular preference is given in this case to dialkyltin dicarboxylates and bismuth carboxylates.

The outflow opening may be closed with a simple, space-saving closure, for example a screw closure. However, it may be necessary, in the case of connection of the multichamber vessel to a spray gun, for example, to provide a valve or a separate outflow nozzle in order to assure controlled deployment of the mixture. For this purpose, in an advantageous configuration of the invention, it may be the case that the multichamber vessel has a recess for accommodation of an outflow valve, where the outflow valve is connectable to the outflow opening. If the multichamber vessel is, for example, an injection molding, it is possible to readily provide a shape of the recess matched to the geometry of the outflow valve. Preferably, the outflow nozzle is held in this recess by a friction fit, i.e. in a force-fitting manner. This makes it impossible for the outflow nozzle to be lost in the storage phase.

In order to achieve complete emptying of one chamber after penetration of the penetrable dividing layer, the penetrating element, as already mentioned, may be shaped in different ways. Preference is given to cylindrical rod shapes. In order to ensure precise penetration of the dividing layer, in a further configuration of the invention, the first chamber or the at least one further chamber has a guide for the penetrating element. It will be apparent that the guide is matched to the respective geometry of the penetrating element in order to enable maximum precision of the preferably axial penetrating motion.

In a particularly advantageous configuration of the invention, the penetrating element is braced on a curved brace surface, where the curved brace surface moves from a first location to a second location when a force is exerted, in such a way that the penetrating element is moved from a first position to a second position at the transition from the first to the second location, where the penetrating element penetrates the penetrable dividing layer. This enables particularly precise penetration of the dividing layer and simultaneously the movement of the penetrating element in such a way that, in the event of inadvertent expenditure of excessive force of the penetrating element, there is no damage to the multichamber vessel. Preferably, the curved brace surface moves here from the first location to the second location only when a force above a defined threshold is exerted.

In an advantageous configuration of the invention, it may further be the case that the first and/or the at least one further chamber has a closable opening for introduction of a solvent. One of the openings here may be identical to the outflow opening.

A further aspect of the present invention relates to a system for deploying a paint coating or an adhesive, comprising a multichamber vessel for storing and mixing a multicomponent liquid coating or adhesive system as claimed in any of claims 1 to 12, and a deployment unit, especially a spray gun, releasably connectable to the multichamber vessel.

The system is of comparatively simple construction and enables the intensive mixing of the mixture components assisted solely by agitation of the vessel. For the rest, the advantages mentioned above in connection with the multichamber vessel are correspondingly applicable.

In terms of the method, the object stated at the outset is achieved by a method of mixing a multicomponent liquid coating or adhesive system in a multichamber vessel as claimed in any of claims 1 to 12, comprising the following method steps:

- providing the first mixture component in the first chamber designed as the outer vessel,
- providing the one further mixture component in the at least one further chamber,
- penetrating the penetrable dividing layer encompassed by the dividing wall by means of the hollow penetrating element, where the dividing layer is formed over part of the area of the dividing wall, where the first mixture component or the one further mixture component is introduced through the hollow penetrating element into the chamber of the respective other mixture component, and
- mixing the first mixture component with the one further mixture component, preferably assisted by agitation of the multichamber vessel.

The method of the invention can be performed easily and inexpensively. For the rest, the advantages mentioned above in connection with the multichamber vessel are also applicable to the method. The advantages mentioned in connection with the method of the invention are likewise also applicable mutatis mutandis to the multichamber vessel.

Mixture components envisaged in accordance with the invention that are used include coating materials, especially paint and adhesives, where it is advantageous to separately store two or more components during transport and storage and to mix them only shortly prior to application. Examples are coating materials in which the two components have mutually complementary chemical groups. Examples include —NCO and —OH, —SH and/or —NH, and also epoxide and amine, and also acceptor and donor compounds for Michael additions. The individual mixture components may additionally also include catalysts for the reaction of the complementary groups. Alternatively, polymerizable chemical groups may be present in one component, while corresponding initiators or activators are present in the other component. For example, vinylic groups such as acrylates or methacrylates may be present in one component, and peroxides in the other component. The multichamber vessel of the invention is especially advantageous for mixture components of low viscosity. More particularly, the mixture components have a viscosity below 10 000 mPas, more preferably below 2000 mPas and most preferably below 250 mPas. Viscosity figures are based on measurements to DIN EN ISO 3219/A3 at 23° C. and a shear gradient of 100 $s^{-1}$, measured with a Physica MCR 51 rheometer instrument from Anton Paar Germany GmbH (DE).

It is also advantageous for the mixing when the viscosity of the two mixture components is not too different. The viscosity of the more viscous component should therefore be not more than 500%, preferably 150%, especially preferably not 50%, above that of the other component.

In an advantageous configuration of the invention, the volume ratio between the first mixture component in the first chamber and the one further mixture component in the at least one further chamber is 1:1 to 9:1, preferably 1:1 to 5:1.

Figure 2:
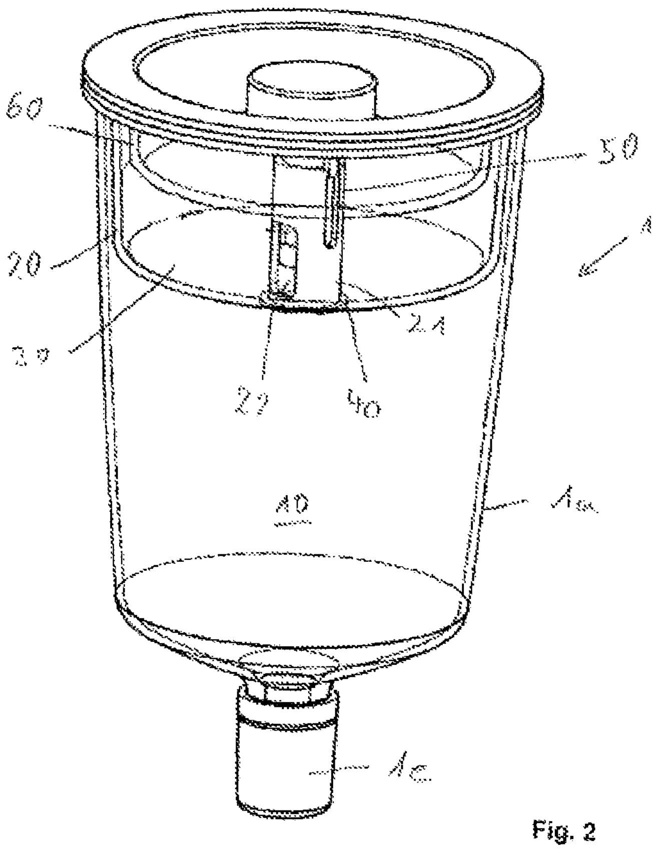
Figure 3:
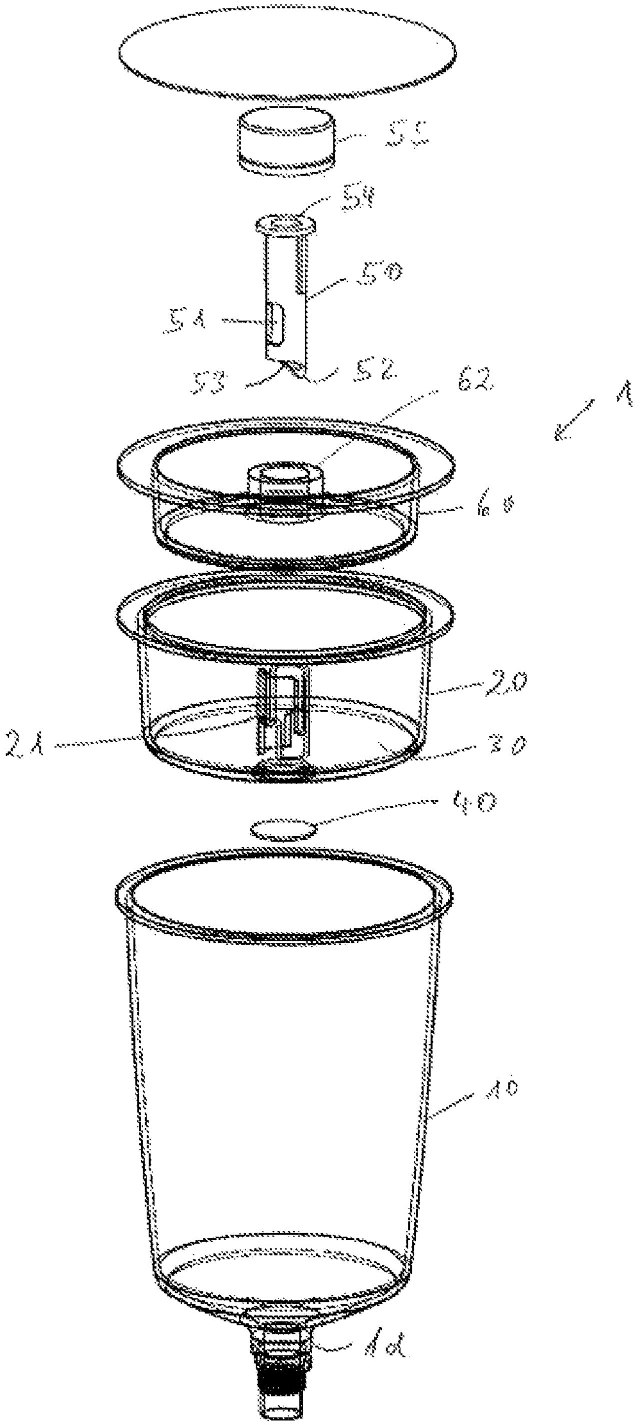
Figure 4:
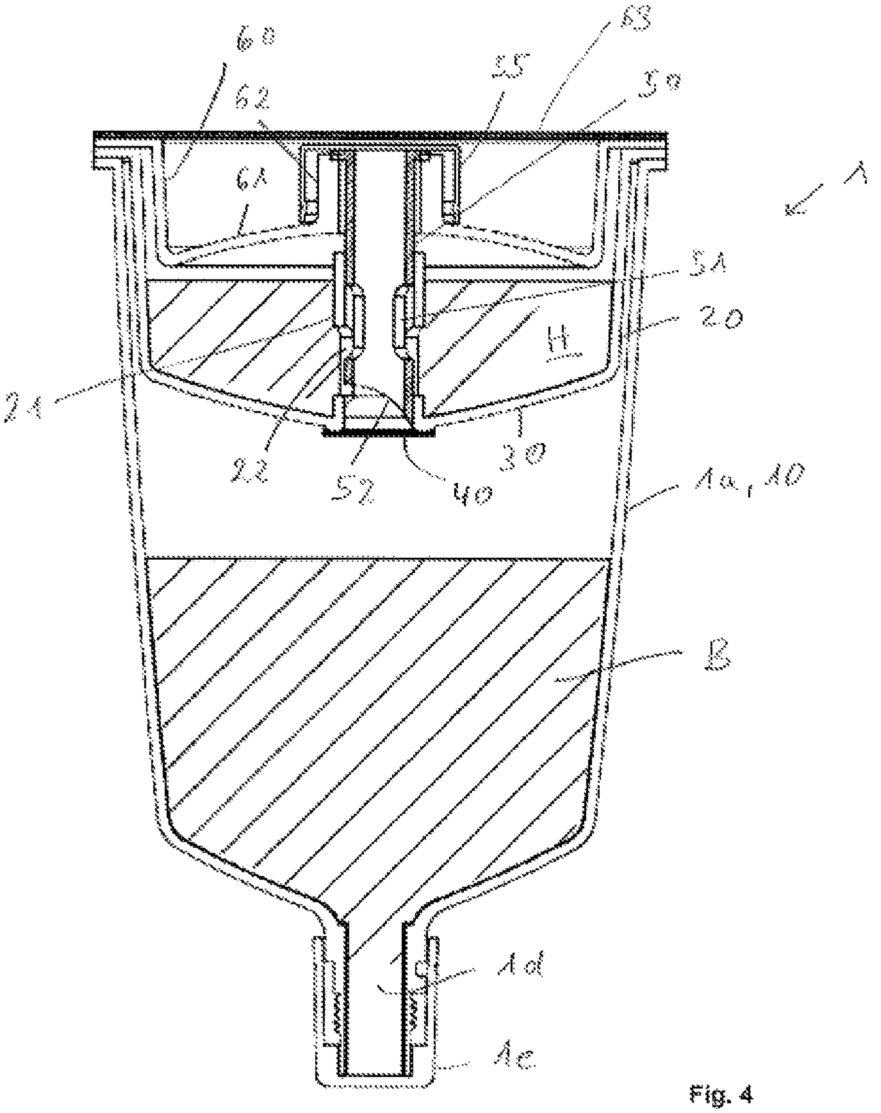
Figure 5:
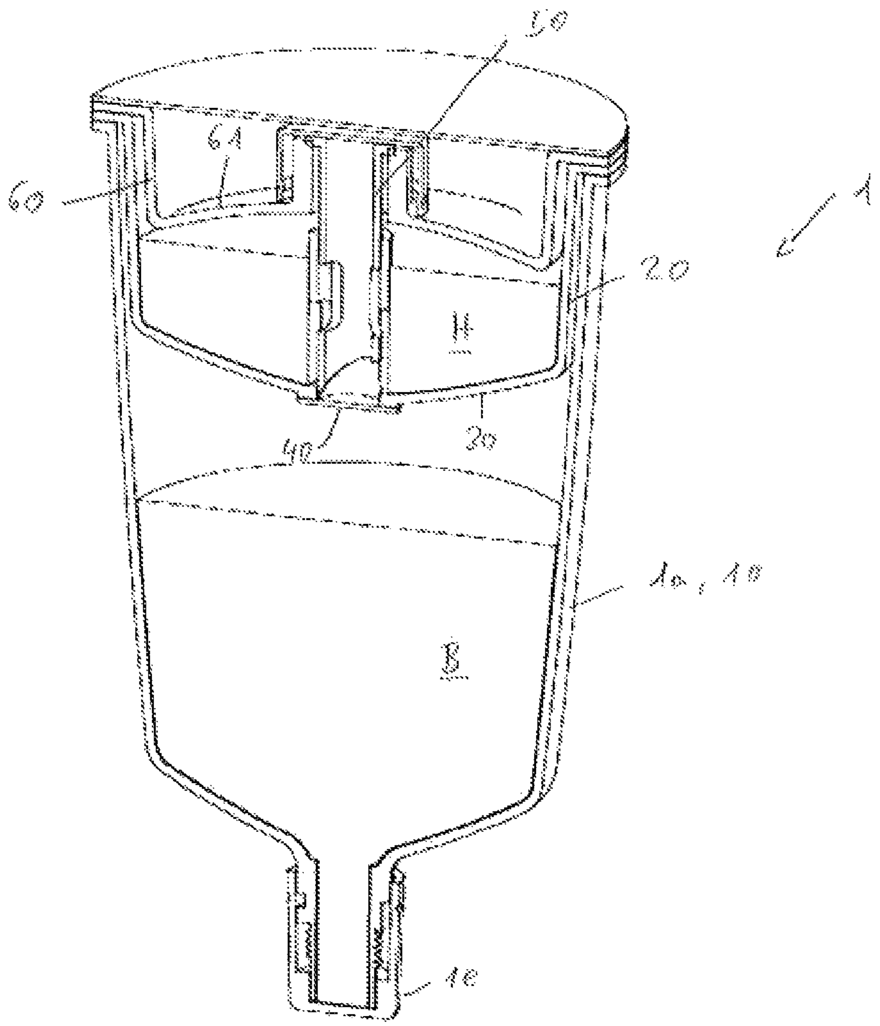
Figure 6C:
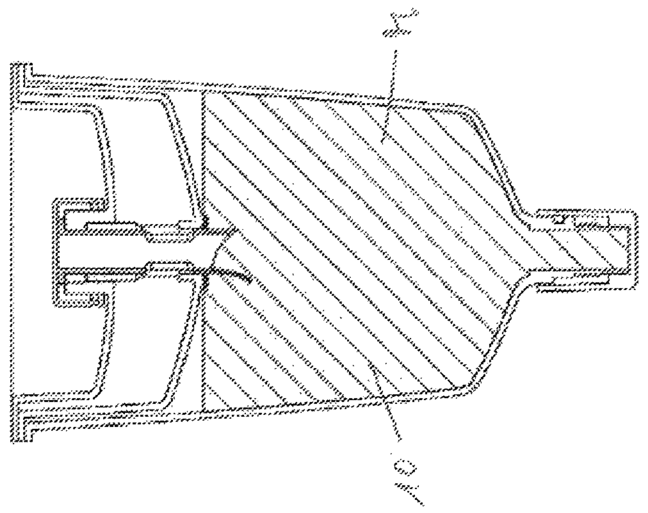
Figure 6B:
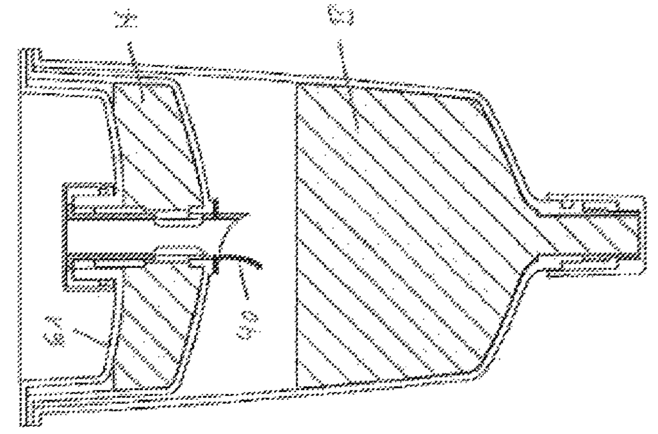
Figure 6A:
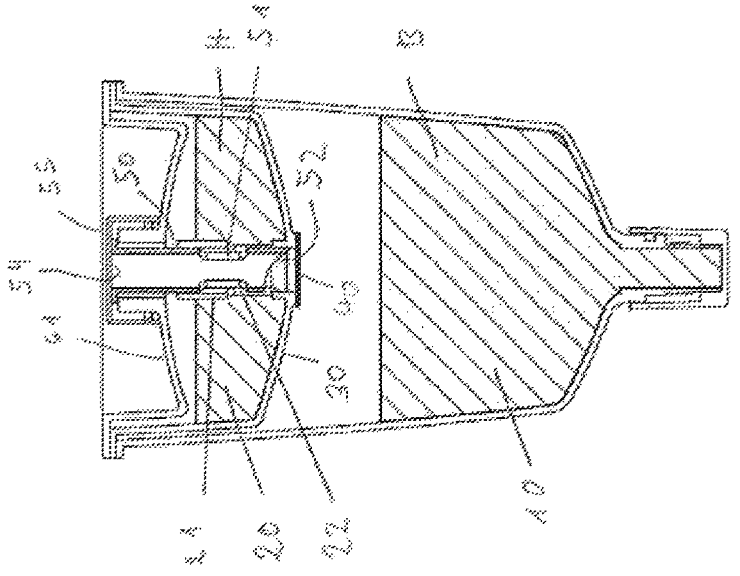
Figure 7:
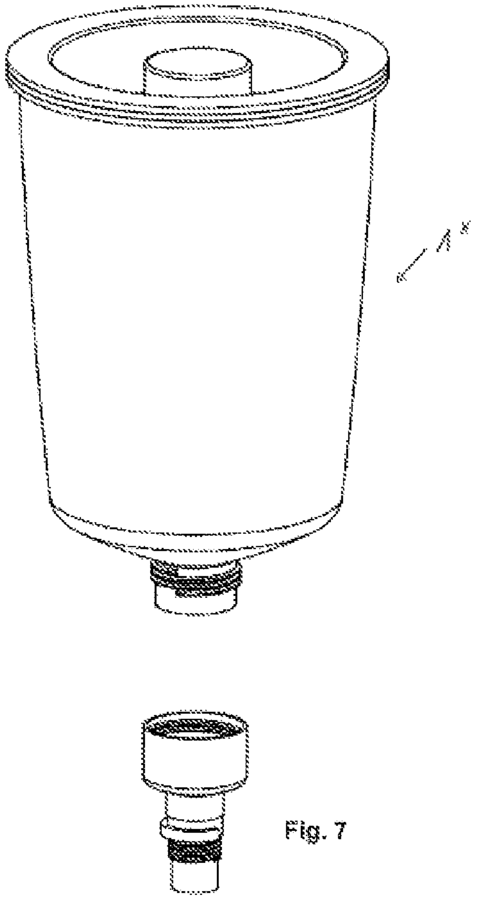
Figure 8:
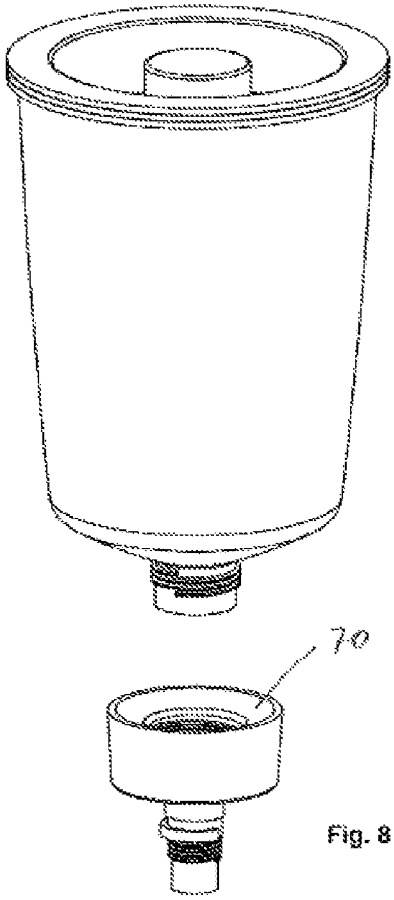
Figure 9B:
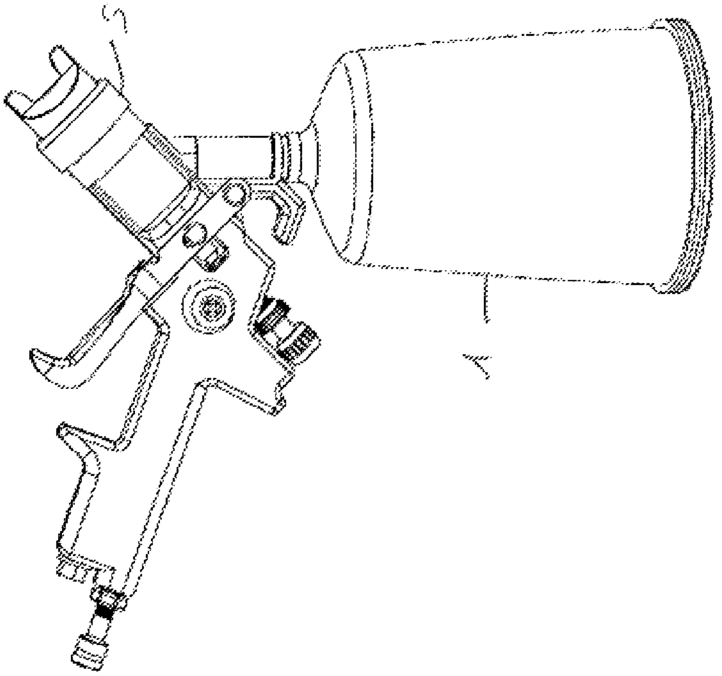
Figure 9A:
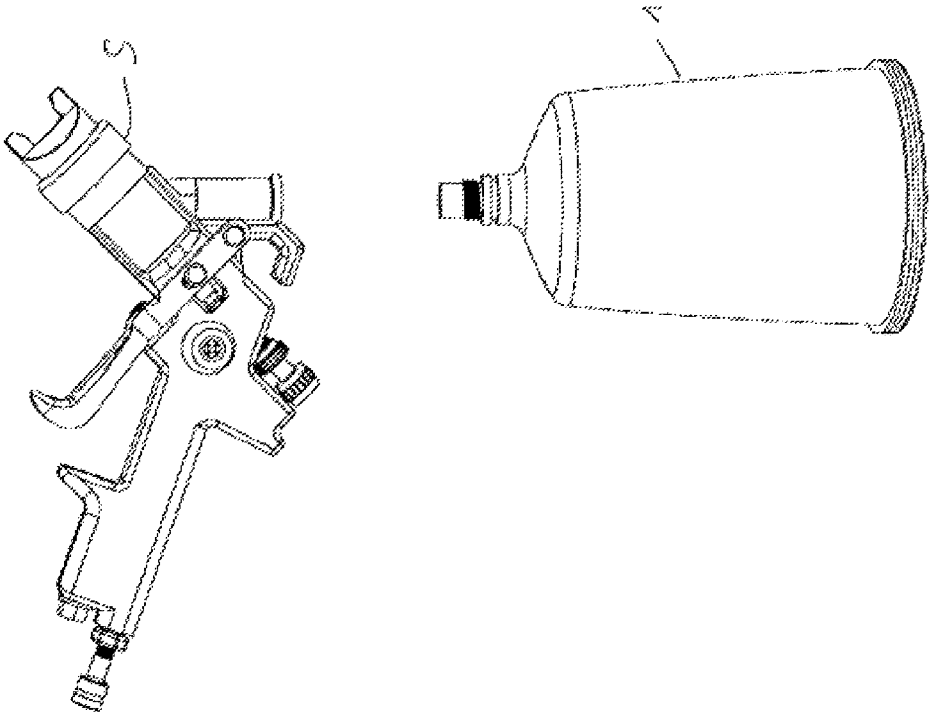

The invention is elucidated in detail hereinafter by drawing that shows a working example. In the figures:

FIG. 1 shows a multichamber vessel for storing and mixing a multicomponent liquid coating or adhesive system in perspective view, FIG. 2 shows the multichamber vessel of FIG. 1 in transparent form in perspective view, FIG. 3 shows the multichamber vessel of FIG. 2 in an exploded view, FIG. 4 shows the multichamber vessel of FIG. 2 in lateral longitudinal section, FIG. 5 shows the multichamber vessel of FIG. 2 in perspective longitudinal section view, FIGS. 6*a-c* show the mixing of a two-component paint system in a multichamber vessel according to FIG. 1 or 2, FIG. 7 shows the multichamber vessel of FIG. 1 in perspective view with an outflow nozzle, FIG. 8 shows the multichamber vessel of FIG. 1 in perspective view with an outflow nozzle with integrated catalyst capsule, and FIGS. 9*a, b* show the connection of a multichamber vessel according to FIG. 1 to a spray gun.

FIG. 1 shows a multichamber vessel 1* for storing and mixing a multicomponent liquid coating or adhesive system M in perspective view. The multichamber vessel 1* comprises an outer vessel 1*a with a slightly conically shaped outer wall 1*b that merges at its lower end into a significantly funnel-shaped wall section 1*c. At its lower end, the multichamber vessel 1* has a lower outflow opening 1*d, closed in the present case by a screw closure 1*e**.

FIG. 2 shows the multichamber vessel 1 of FIG. 1 in a transparent form in perspective view. With regard to the shape, there is no further difference in the multichamber vessels 1*, 1 of FIGS. 1 and 2. As apparent in FIG. 2, the multichamber vessel 1 comprises a first chamber 10 for a first mixture component, for example the binder B of a 2K (two-component) polyurethane lacquer. In addition, the multichamber vessel 1 comprises a second chamber 20 for a second mixture component, for example the curing agent H of the 2K polyurethane lacquer. The first chamber 10 and the second chamber 20 are divided from one another in a liquid-tight manner by a dividing wall 30. The dividing wall 30 comprises a penetrable dividing layer 40 formed over part of the area of the dividing wall 30. In addition, the multichamber vessel 1 comprises a penetrating element 50 for penetrating the penetrable dividing layer 40. This has the function, on actuation, of penetrating the dividing layer 40 in such a way that the mixture components B, H in either the first or second chamber 10, 20 mix in the first chamber 10 in the present embodiment.

The first chamber 10 is formed in the present case by the outer vessel 1*a* of the multichamber vessel 1, while the second chamber 20 takes the form of a cup-shaped insert in the outer vessel 1*a*. In addition, the dividing wall 30 with the penetrable dividing layer 40 is formed by the base of the cup-shaped insert of the second chamber 20. As apparent in the longitudinal section view of FIG. 4 in particular, the dividing wall 30 is in slightly curved or conical form. This facilitates complete runout of the mixture component H present in the second chamber 20. As mentioned, the dividing layer 40 is arranged over part of the area of—and preferably also centrally in—the dividing wall 30 that forms the base of the cup-shaped insert. The second chamber 20 additionally has a cylindrical guide 21 comprising two axially aligned longitudinal holes 22 and arranged centrally in the second chamber 20, in which the penetrating element 50 is guided, as described further down.

As apparent in the exploded diagram of FIG. 3 in particular, the penetrating element 50 has an essentially cylindrical shape matched to the cylindrical guide 21 as part of the second chamber 20 configured as a cup-shaped insert. The penetrating element 50 is hollow on the inside and has a first opening 53 at the end, a second opening 54 provided at the opposite end from the first end opening 53, and longitudinal holes 51 on the outside. The end opening 53 is surrounded by a cutting edge 52 with which the dividing layer 40 can be penetrated reliably and precisely on axial movement of the penetrating element 50 in the direction of the dividing layer 40. By means of the second end opening 54, it is possible, for example, to add a solvent to the mixture component H in the second chamber 20 if required. In the penetrated state of the dividing layer 40, the opening 54 can also be used to add a solvent for the mixture M prepared. Finally, the second end opening 54 can be closed by a closure 55, for example a screw closure.

As apparent in FIGS. 2 to 6, the multichamber vessel 1 has a second insert 60 in the form of a cup or dish, which is disposed above the second chamber 20 in the assembled state of the multichamber vessel 1. This insert 60 has a base surface 61 curved inward and a further central cylindrical guide 62 for the penetrating element 50. According to the longitudinal section view of FIG. 4, the multichamber vessel 1 is concluded at the top by means of a lid 63, for example in the form of a film. The penetrating element 50 is braced via the closure 55 on the curved base surface 61, which, when a force above a pressure threshold is expended, moves from a first location to a second location. At the transition from the first to the second location, the penetrating element 50 is moved from a first position to a second position and penetrates the penetrable dividing layer. At the same time, the axial movement of the penetrating element 50 is limited.

The mixing operation is elucidated hereinafter in association with FIGS. 6*a*-6*c*. According to FIG. 6*a*, the first chamber 10 is partly filled with a first mixture component B, in the present case the binder of a 2K polyurethane lacquer, while the second chamber 20 in the form of a cup-shaped insert is filled with a second mixture component H, in the present case the curing agent of the 2K polyurethane lacquer, in the quantitatively correct ratio relative to the first mixture component. The penetrating element 50 is in its starting position in which the blade 52 is disposed immediately above the penetrable dividing layer 40 which is central with respect to the dividing surface 30, and the longitudinal holes 51 of the penetrating element 50 are in an axially offset arrangement relative to the longitudinal holes 22 of the cylindrical guide 21. The penetrating element 50 is closed at its end opening 54 by a closure 55, the topside of which serves simultaneously as actuation surface for the penetrating element 50.

By appropriate pressure on the closure 55, the penetrating element is moved axially in the direction of the dividing layer 40, with precise penetration of the dividing layer by the blade 52. The axial movement is limited here in that the curved surface 61 of the second dish-shaped insert 60 is moved preferably by means of a snap motion from the rest position in which the curved surface 61 is curved inward with respect to the second dish-shaped insert 60 (FIG. 6*a*) to an actuation position in which the curved surface 61 is curved outward (FIG. 6*b*).

In the course of this, the longitudinal holes 51 of the penetrating element 50 and the longitudinal holes 22 of the cylindrical guide 21 start to become aligned, so as to result in a liquid-conducting connection between the second chamber 20 and the inner volume of the hollow penetrating element 50, as apparent in FIG. 6*b*, with flow of the second mixture component H into the inner volume of the penetrating element 50. At the same time, owing to the penetration of the dividing layer 40 (see FIG. 6*b*), a liquid-conducting connection is likewise established between the inner volume of penetrating element 50 and the first chamber 10, such that the second mixture component H flows into the first chamber 10 and mixes with the first mixture component B. The mixing effect can be intensified by appropriate agitation of the multichamber vessel 1.

FIG. 6*c*, finally, shows the multichamber vessel 1 with the mixture M consisting of binder B and curing agent H, which react with one another to produce the 2K polyurethane lacquer, in the first chamber 10. The second chamber 20 has been completely emptied here, which is favored by the slightly conical shape of the dividing wall 30.

FIG. 7 shows the multichamber vessel of FIG. 1 in perspective view with a separate outflow nozzle that can be screwed on.

FIG. 8 shows a particularly advantageous configuration in which the separate outflow nozzle 70 that can be screwed on comprises an annular catalyst capsule containing a catalyst material. This makes it possible for the mixture M formed from the first and second mixture components B, H, as it flows out, to come into contact with the catalyst material, which results in a faster chemical reaction, which shortens the processing time of the mixture M, such that the curing of the 2K polyurethane lacquer, for example, is accelerated after deployment.

FIGS. 9*a* and 9*b* show the connection of a multichamber vessel according to FIG. 1 to a spray gun S. The spray gun S may be of conventional design and may be operated with compressed air.

The invention claimed is:

1. A multichamber vessel for storing and mixing a multicomponent liquid coating or adhesive system (M) having a first chamber for a first mixture component (B) and at least one further chamber for a further mixture component (H), where the first chamber and the at least one second chamber are divided from one another in a liquid-tight manner by at least one dividing wall, where the at least one dividing wall comprises a penetrable dividing layer, and having at least one penetrating element for penetrating the penetrable dividing layer in such a way that the first and further mixture components (B, H) mix in the first or the at least one further chamber, wherein the at least one further chamber is arranged coaxially relative to the first chamber, where the first chamber further takes the form of an outer vessel, where the at least one further chamber is designed as an insert in the form of a cup in the outer vessel, where the penetrable dividing layer forms part of the area of the at least one dividing wall, where the at least one penetrating element is in hollow form and has at least two longitudinally offset openings for introduction of one of the first or further mixture components (B, H) into the chamber of the respective other mixture component (H, B), where the at least one penetrating element is further braced on a curved brace surface which moves from a first location to a second location when a force above a pressure threshold is exerted, in such a way that the at least one penetrating element is moved from a first position to a second position at the transition from the first to the second location, where the at least one penetrating element penetrates the penetrable dividing layer.

2. The multichamber vessel as claimed in claim 1, wherein the volume ratio between the first chamber for the first mixture component (B) and the at least one further chamber for the further mixture component (H) is 1:1 to 9:1.

3. The multichamber vessel as claimed in claim 1, wherein the penetrable dividing layer is arranged centrally in the at least one dividing wall.

4. The multichamber vessel as claimed in claim 1, wherein the at least one dividing wall surrounding the penetrable dividing layer is in conical form.

5. The multichamber vessel as claimed in claim 1, wherein the multichamber vessel and the first chamber and/or the at least one further chamber are formed from a transparent or translucent material.

6. The multichamber vessel as claimed in claim 1, wherein the multichamber vessel has a closable outflow opening for the mixture (M) formed from the first and further mixture components (B, H).

7. The multichamber vessel as claimed in claim 6, wherein a catalyst capsule containing a catalyst material is disposed at the outflow opening, in such a way that the mixture (M) formed from the first and further mixture components (B, H) comes into contact with the catalyst material as it flows out.

8. The multichamber vessel as claimed in claim 6, wherein the multichamber vessel has a recess for accommodation, in a force-fitting manner, of an outflow nozzle, where the outflow nozzle is connectable to the outflow opening.

9. The multichamber vessel as claimed in claim 1, wherein the first chamber or the at least one further chamber has a guide for the at least one penetrating element.

10. The multichamber vessel as claimed in claim 1, wherein the first and/or the at least one further chamber has a closable opening for introducing a solvent.

11. A system for deploying a paint coating or an adhesive, comprising a multichamber vessel for storing and mixing a multicomponent liquid coating or adhesive system (M) as claimed in claim 1, and a deployment unit, a spray gun (S), releasably connectable to the multichamber vessel.

12. A method of mixing a multicomponent liquid coating or adhesive system in a multichamber vessel as claimed in claim 1, comprising the following method steps:

providing the first mixture component (B) in the first chamber designed as the outer vessel, providing the further mixture component (H) in the at least one further chamber, penetrating the penetrable dividing layer encompassed by the at least one dividing wall by means of the hollow penetrating element braced on the curved brace surface, where the at least one penetrating element moves from the first location into the second location and where the first mixture component (B) or the further mixture component (H) is introduced through the hollow penetrating element into the chamber of the respective other mixture component (H, B), and mixing the first mixture component (B) with the further mixture component (H), assisted by agitation of the multichamber vessel.

13. The method as claimed in claim 12, wherein the volume ratio between the first mixture component (B) in the first chamber and the further mixture component (H) in the at least one further chamber is 1:1 to 9:1.

* * * * *